United States Patent [19]

Bouyoucos

[11] 4,131,178
[45] Dec. 26, 1978

[54] SEISMIC SOURCE FOR USE UNDER WATER

[75] Inventor: John V. Bouyoucos, Rochester, N.Y.

[73] Assignee: Hydroacoustics, Inc., Rochester, N.Y.

[21] Appl. No.: 855,854

[22] Filed: Nov. 30, 1977

[51] Int. Cl.$^2$ .............................................. G01V 1/04
[52] U.S. Cl. ................................... 181/120; 181/118
[58] Field of Search ................ 181/117, 118, 119, 120

[56] References Cited

U.S. PATENT DOCUMENTS

| 3,638,752 | 2/1972 | Wakefield | 181/120 |
| 3,979,140 | 9/1976 | Silverman et al. | 181/120 |
| 4,049,078 | 9/1977 | Paitson et al. | 181/120 |

FOREIGN PATENT DOCUMENTS 2308112  11/1976  France ..................... 181/120

OTHER PUBLICATIONS

V. Renard et al.; Offshore Technology Conference; Paper #OTC 2017; 5-1974.

Primary Examiner—S. C. Buczinski
Attorney, Agent, or Firm—Martin LuKacher

[57] ABSTRACT

A seismic source is described which drives one or more jets of high velocity water into an underwater environment and then abruptly terminates the jets. The momentum of the free jet columns generate vapor cavities in the water away from the housing of the source which cavities collapse coherently to generate the seismic signal. A piston and a valve sleeve are slidably mounted in a cylinder in the housing. The piston seals off a volume of gas on its rearward side. The forward side of the piston defines one surface of a chamber. The chamber receives high pressure water from an inlet. In its rearward position, the valve sleeve seals a set of jet apertures in the side of the cylinder. In its forward position the valve sleeve opens the apertures, exposing the chamber interior to the exterior underwater environment. With the valve sleeve in its rearward position with the apertures sealed, the high pressure water entering the chamber moves the piston to its rearward position and compresses the gas. The sleeve is hydraulically actuated upon command to abruptly open the jet apertures, enabling the piston to move forwardly under the pressure of the compressed gas, driving the water through the jet apertures so as to form the jets. The piston enters the interior of the sleeve near the forward end of its stroke and, concurrently, abruptly terminates the jets. To re-arm the source, the sleeve is actuated to close the jet openings whereupon the high pressure water re-sets the piston. Upon the next command, the valve sleeve is again actuated to open the apertures and the next seismic signal is generated.

14 Claims, 5 Drawing Figures

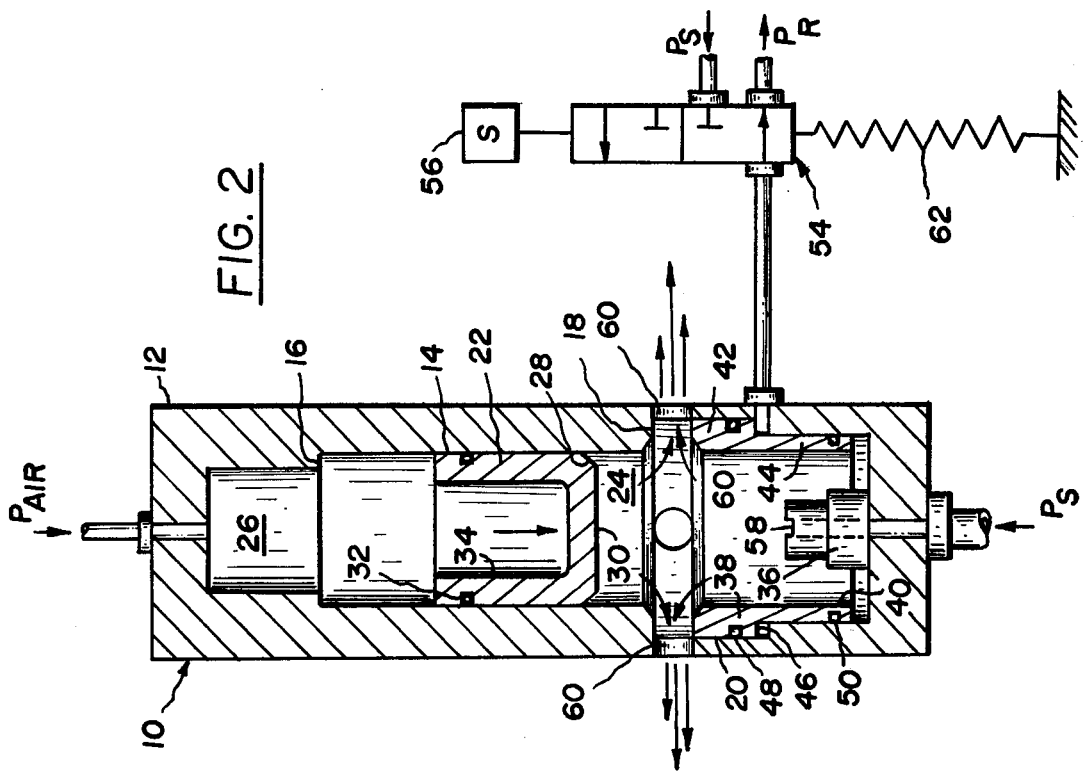
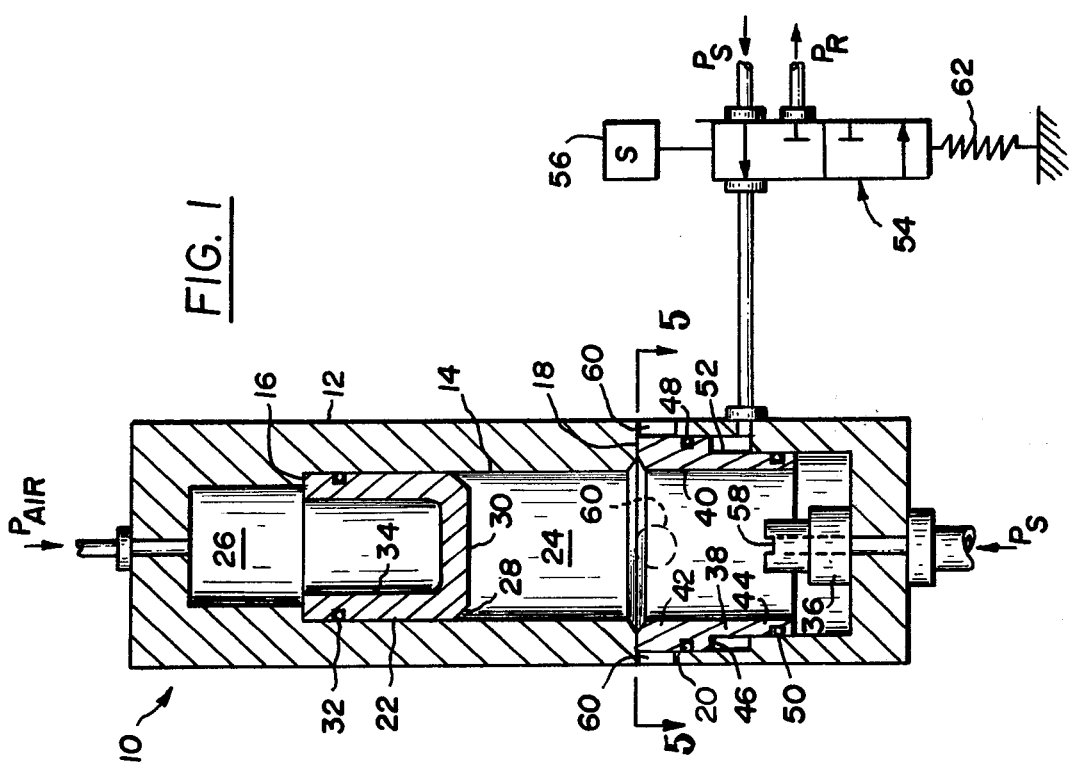

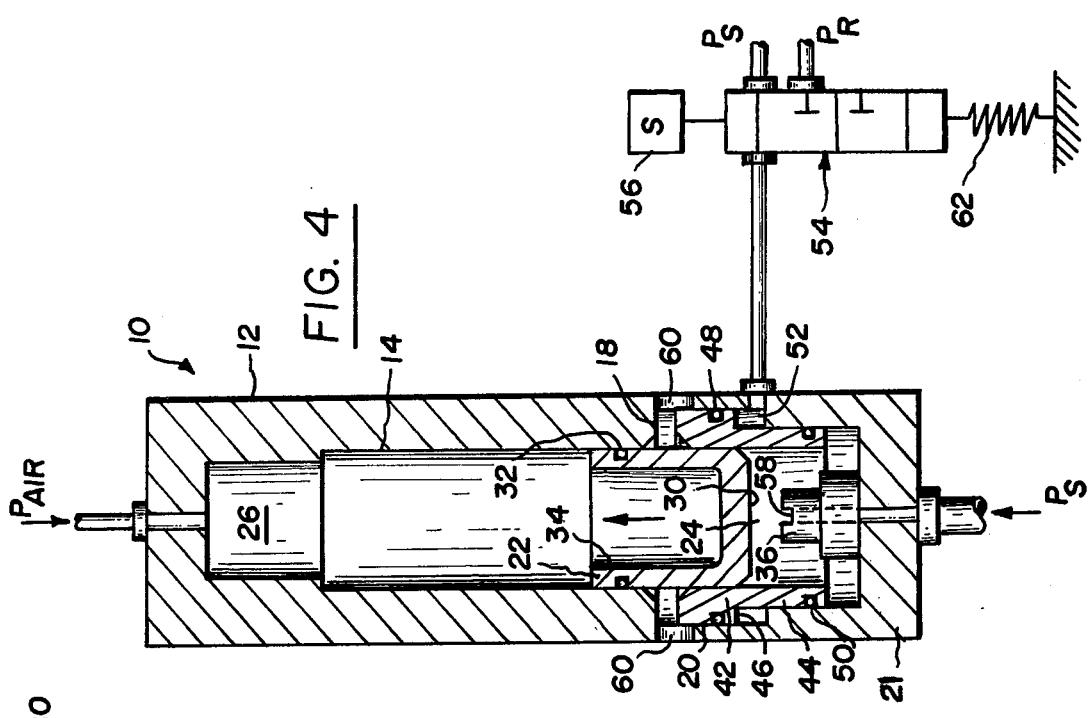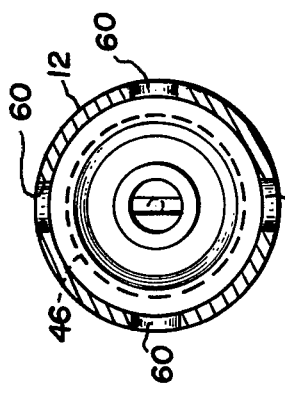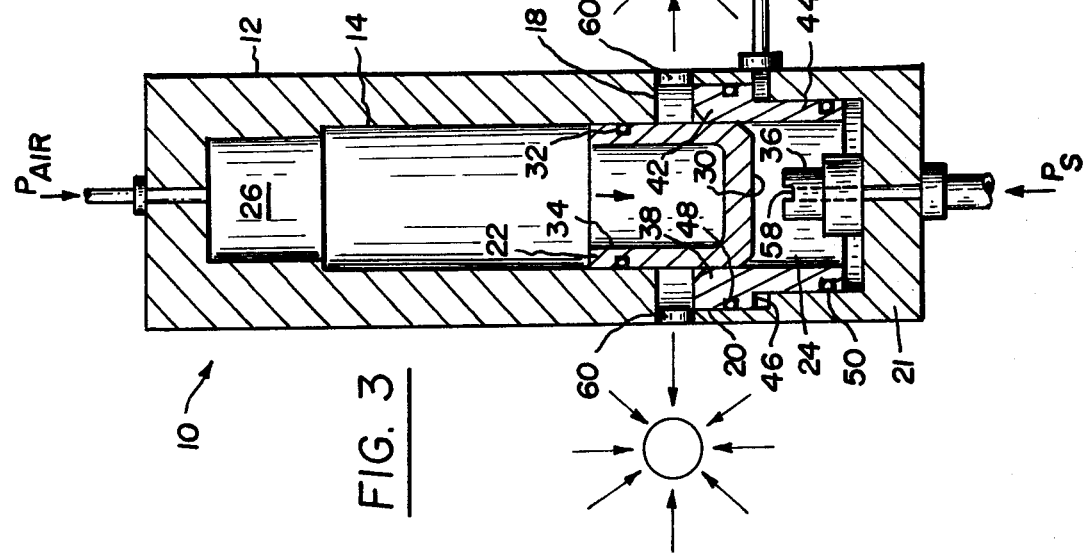

SEISMIC SOURCE FOR USE UNDER WATER

The present invention relates to seismic sources and particularly to a seismic source of the type which generates seismic signals by means of the collapse of vapor cavities formed when a free jet column of water is launched into an underwater environment.

The invention is especially suitable for use in providing an improved seismic source of the so-called "water-gun" type wherein a high velocity water jet is abruptly terminated, at it leaves the housing of the source, to generate a cavity or void away from the housing which cavity collapses to produce a pressure transient, providing a seismic signal.

Water gun seismic sources which have heretofore been used require an air compressor which supplies compressed air to a fast-acting valve. When the valve is released, the compressed air is applied to drive a piston which forces water through a nozzle for developing the jet. The compressed air also cocks or resets the piston of the gun. The charge of compressed air for firing the gun is lost each cycle, leading to inefficient operation and long cycle times (i.e., low firing rates), for example, one shot every eight seconds for a large gun. In addition, the nozzle which forms the jet is located along the axis of the piston, the jet must be deviated by 90° into a number of secondary jets in order to minimize the recoil of the gun on firing. The deviation process leads to further inefficiencies in operation, for example due to turbulent flow in the secondary jets.

It is an object of the present invention to provide an improved seismic source of the type which develops one or more free jet columns of water in order to generate a seismic signal in which the foregoing disadvantages are obviated.

It is a further object of the invention to provide an improved seismic source of the water gun type which is actuated by high pressure water rather than by compressed air as the energy source and thus provides higher operating efficiency than water gun sources which have heretofore been suggested.

It is a still further object of the present invention to provide an improved seismic source of the water gun type which can provide opposed jets for recoil elimination without the need for jet deviation, thus affording more efficient operation than water gun type sources heretofore proposed.

It is a still further object of the present invention to provide an improved seismic source of the water gun type which is precisely controllable in time of firing and may be used in arrays containing a multiplicity of sources which can be operated simultaneously or in precise time sequence.

Briefly described, a seismic signal source provided by the invention for use under water contains a housing having a cylinder. A piston is slidably disposed in the cylinder for travel in forward and rearward directions and divides the cylinder into first and second chambers on the forward and rearward sides of the piston. The second chamber has a gas trapped therein which is compressed when the piston travels in the rearward direction. High pressure water is supplied to the first chamber. A water jet forming aperture extends through the housing into the first chamber. This aperture may be one of a pair of apertures which are diametrically opposite each other. A valve member is slidably disposed in the first chamber in porting relationship with the jet aperture for opening the aperture to enable the piston to travel under the force of the compressed gas in the forward direction to drive a jet of water through the aperture. No jet deviation is involved since the jet is developed in an aperture whose axis is already at 90° to the direction of travel of the piston. The piston is also disposed in porting relationship with the jet aperture for closing the aperture, after the opening thereof by the valve member, to terminate the jet and generate a vapor cavity in the water outside the housing. The collapse of this cavity produces the seismic signal. To this end the valve member may be a sleeve which receives the piston in sealing relationship such that the aperture is closed as the forward edge of the piston enters the sleeve. The valve member is actuated to close the jet aperture after the jet is terminated. This enables the pressurized water in the first chamber to drive the piston in the rearward direction thereby resetting the source. Upon command the valve is actuated to open the aperture and the next seismic signal is then generated.

The foregoing and other objects and advantages of the invention as well as a presently preferred embodiment thereof will be more apparent from a reading of the following descriptions in connection with the accompanying drawings in which:

FIGS. 1 through 4 are sectional views of a seismic source embodying the invention each showing the source in a different position during the cycle of operation thereof; and FIG. 5 is a sectional view of the source shown in FIGS. 1 through 4; the section being taken along the line 5—5 in FIG. 1.

Referring more particularly to the drawings, the water gun 10 has a cylindrical housing 12 having a bore which forms a closed cylinder 14. The cylinder has regions of different diameter which forms steps 16 and 18. A cylindrical groove 20 is located in the inner wall of the cylinder 14 below the step 18. The step 18 is tapered in part and in part forms a lip.

A piston 22 is slidably disposed in the cylinder 14 and divides the cylinder into a first chamber 24 and a second chamber 26 on the forward and rearward sides thereof respectively. The outer wall of the piston has an inward taper 28 at the forward end 30 thereof. A "O" ring 32 seals the first chamber 24 from the second chamber 26. The rearward end of the piston has a large blind opening 34 therein for purposes of lightening the piston's weight. The step 16 serves as a stop for the travel of the piston in the rearward direction. A cylindrical stub 36 which extends upwardly from the bottom of the housing serves as a stop for the piston travel in the forward direction.

A valve member 38 in the form of a cylindrical sleeve is slidably disposed in the first chamber 24 and fits into the groove 20. The opening 40 in the sleeve valve member 38 is of the same diameter as the piston. The rearward portion 42 of the sleeve 38 is of larger diameter than the forward portion 44 thereof and forms a step 46. The outer diameter of the portion 42 has a sliding fit in the groove 20 and a seal is provided by an "O" ring 48. The forward portion 44 has a sliding fit with the cylinder 14 and a seal is provided by another "O" ring 50. A control chamber 52 is formed in the groove 20 between the wall of the housing 12 and the step 46 and outer diameter of the lower portion 44 of the valve sleeve member 38.

Electrohydraulic control means for the source which operate to actuate the valve sleeve member 38 is provided by an electrohydraulic valve 54. This valve may include a spool which is moved by a solenoid 56 operated by electrical command signals applied thereto. The valve 54 switches pressurized hydraulic fluid between high and low pressures indicated as $P_S$ and $P_R$ into the control chamber 52. This fluid is preferably water and may be supplied from a pump. The pressure $P_S$ is higher than the pressure of the ambient water at the depth of operation. A suitable pressure is 2000 $P_S$. The high pressure side provides the fluid at the supply pressure $P_S$ while the low pressure side or return pressure is $P_R$. The return pressure may also come from a reservoir which is connected to the return side of the pump.

High pressure water, preferably at the same pressure $P_S$ and suitably supplied from the same pump is continuously applied at the first chamber 24. A conduit through the bottom of the housing 12 which extends through the stop 36 provides access for the high pressure fluid to the first chamber 24. The upper end of the stop 36 has a notch 58 to prevent the sealing off of the high pressure water supply to the chamber 24 when the forward end 30 of the piston moves up against the stop 36.

Compressed gas, suitably air, is supplied to the second chamber 26. Preferably the chamber 26 is sealed as by a stop cock after being filled with compressed air to the desired pressure. As will become more apparent as the description proceeds the compressed air is used only as an energy storage means. It may be noted that for deep water operation the chamber 26 may be sealed at the surface. This will provide sufficient air pressure in the chamber 26 for energy storage and for developing compressed air forces on the piston when the source is fired. The energy for cocking the piston (viz, resetting it in the position against the stop 16 as shown in FIG. 1) is supplied hydraulically by the high pressure water at $P_S$. The high velocity jets are formed in apertures 60. These apertures are disposed at 90° to the direction of movement of the piston 22 (viz, perpendicularly to the axis of the cylinder 14). There are no apertures or nozzles to form the jet within the cylinder. The jet is formed at 90° to the direction of piston travel and jet deviation by 90° is not necessary. The jet apertures 60 are disposed in pairs, two pairs being shown. THe apertures are diametrically opposite to each other and the pairs of apertures are disposed with their axes in the same plane which is perpendicular to the axis of piston travel. The apertures 60 may be circular in cross section and typically may have areas in total of one-fourth to one-tenth that of the area of the forward end 30 of the piston 22. The major portion of the kinetic energy that is developed by the source 10 is in the jets, while only a small portion is associated with the motion of the piston 22. The configuration of the source 10 provides for the generation of jet columns of desirably long lengths, since the forward stroke of the piston to the position where the jets are terminated may be made long. For example, the piston travel from the reset position shown in FIG. 1 to the jet orifices 60 may be several times the diameter of the piston.

FIG. 1 shows the source armed for firing. The control valve 54 is not actuated (viz, the solenoid 56 has not received a command signal and is not pulled in). The spring 62 thus positions the valve so that water at supply pressure $P_S$ is applied to the cavity 52. The valve member 38 is in its rearward position with its rear end (the upper end as shown in the drawing) butted against the sealing lip 18 of the housing 12. Consider that the area of the upper end of the sleeve valve member 38 is about twice the area of the lower end thereof within the cavity 24 and about twice the area of the step 46.

Consider also a linear pressure drop across the sealing lip 18 when the valve is closed. Then the force due to the pressure on the lower end of the valve member and on the step 46 tending to close the valve is almost twice the force on the upper end of the valve member 38 tending to open the valve. The valve covers the jet orifices 60 and these orifices remain closed until the valve 38 is actuated, upon command, in the forward direction. Prior to such actuation, pressurized water has forced the piston 22 back against the stop 16 and the gas behind the piston in the chamber 26 is compressed.

When a command signal is applied to the solenoid the valve 54 is abruptly shifted to the position shown in FIG. 2. The pressure in the control cavity 52 then drops to $P_R$. Even with a linear pressure drop across the sealing lip 18, large net forces in the forward direction are developed on the valve member 38 and it moves abruptly in the forward direction (viz, downwardly), to the position shown in FIG. 2. The jet apertures 62 are opened. The piston accelerates in the forward direction applying, approximately, the pressure of the compressed gas in the chamber 26 through the piston 22 to the water in the chamber 24. The water is driven through the jets and forms high velocity jet columns in the marine environment surrounding the housing 12.

When the forward end 30 of the piston passes the jet apertures 60 and enters the opening 40 in the sleeve valve member 38 (see FIG. 3) the apertures 60 are abruptly closed due to the porting relationship therewith of the piston 22. The jets are abruptly terminated, and free jet columns are launched into the water surrounding the housing 12. A set of vapor cavities is generated exterior to the outside wall of the housing 12. The coherent collapse of these cavities forms the pressure transient which provides the seismic signal.

The taper 28 on the front edge of the piston is provided for controlling the deceleration of the piston as it enters the opening 40 in the valve sleeve member 38. Accordingly, the deceleration is controlled and high pressures inside the housing 12 are avoided. Since the piston 22 upon entering the valve sleeve opening 40 tends to seal off the region between the exterior walls of the piston which includes the apertures 60, the pressure on the upper end of the valve sleeve member 38 is decreased below $P_S$ enabling the valve to again close the aperture 60. Also the regions bounded by the apertures, the piston, the larger upper end of the valve member 38 and the portions of the housing 12 opposite to that upper end are at the pressure of the ambient sea water which is less than $P_S$. When $P_S$ is applied to the step 46, the valve membe 38 is easily actuated upwardly to effect such closure.

As shown in FIG. 4, the valve 54 is permitted to return to its initial position (viz, the solenoid 56 is deenergized). The pressure in the control chamber 52 returns to $P_S$. Both the valve 38 and the piston 22 move rearwardly. The valve stops when its upper end butts against the sealing lip 18. The piston travels along its return stroke until it reaches the step 16. The source is then armed and ready for firing to produce the next signal when the next command is applied to the solenoid 56 of the control valve 54.

From the foregoing description it will be apparent that there has been provided an improved seismic source. By means of hydraulic actuation and control considerable efficiencies are obtained and rapid firing is made possible. Variations and modifications in the herein described source will undoubtedly suggest themselves to those skilled in the art. Accordingly, the foregoing description should be taken merely as illustrative and not in any limiting sense.

What is claimed is:

1. A seismic signal source for use under water which comprises
   (a) a housing having a cylinder,
   (b) a piston slidably disposed in said cylinder for travel in opposite directions and dividing said cylinder into first and second chambers on opposite sides of said piston,
   (c) said second chamber having a gas trapped therein which is compressed when said piston travels in one of said directions,
   (d) means for supplying pressurized water to said first chamber,
   (e) a water jet forming aperture extending through said housing into said first chamber,
   (f) a valve member slidably disposed in said first chamber in porting relationship with said jet aperture for opening said aperture to enable said piston to travel under the force of said compressed gas in the other of said directions to drive a jet of water through said aperture,
   (g) said piston also being disposed in porting relationship with said jet aperture for closing said aperture after the opening thereof by said valve member to terminate said jet and generate a vapor cavity in the water outside said housing, the collapse of which produces the seismic signal, and
   (h) means for actuating said valve member to close said jet aperture after said jet is terminated to enable the pressurized water in said first chamber to drive said piston in said one direction to reset said source and for opening said aperture when the next seismic signal is to be generated.

2. The invention as set forth in claim 1 wherein the axis said jet aperture is disposed at about 90° to said direction of travel of said piston.

3. The invention as set forth in claim 2 wherein at least a pair of said apertures are provided which are disposed diametrically opposite to each other.

4. The invention as set forth in claim 3 wherein said apertures are circular ports in the wall of said housing.

5. The invention as set forth in claim 1 wherein said valve member is movable in opposite directions over a stroke which is substantially smaller than the travel of said piston.

6. The invention as set forth in claim 1 wherein said valve actuating means comprises fluid pressure operated means for developing hydraulic forces to move said valve member in said opposite directions; and electrohydraulic control means for controlling said fluid pressure means in response to command signals.

7. The invention as set forth in claim 6 wherein said fluid pressure operated means comprises a control chamber defined by said valve member and the wall of said cylinder on which said valve member is slidably disposed, said valve member presenting to said control chamber a first surface area in a plane normal to the direction of movement of said valve member on which pressurized fluid forces are developed for moving said valve member, and said electrohydraulic means comprising a valve for selectively applying pressurized hydraulic fluid at a higher and a lower pressure to said control chamber.

8. The invention as set forth in claim 7 wherein said higher pressure is the same as the pressure of the water supplied to the said first chamber, and said valve member having at opposite ends thereof in said first chamber surface areas in planes normal to the direction of movement of said valve member, one of which is larger than the other.

9. The invention as set forth in claim 8 wherein the larger end of said valve member is disposed adjacent to said jet aperture and is disposed in overlapping relationship with said piston when said piston closes said jet aperture so as to define a region within said housing bounded by said aperture, said piston, said larger end of said valve member and the portion of said housing opposite to said larger end of said valve member, which region is at the pressure of the water surrounding said housing.

10. The invention as set forth in claim 1 wherein said valve is a sleeve the outer wall of which is disposed in sliding relationship with said housing and the inner wall of which defines an opening which receives said piston with the outer wall thereof in sealing relationship with said inner wall when said piston travels in said other direction to close said aperture and terminate said jet.

11. The invention as set forth in claim 10 wherein the cross sectional area of said cylinder and the circumferential opening defined by the rear end of said sleeve and the sealing lip of said cylinder when said valve is in its forward position is much larger than the cross section area of said aperture such that said jet of water is formed in said aperture.

12. The invention as set forth in claim 11 including means in said housing for limiting the travel of said piston in said one direction away from said valve member and in the opposite direction toward and into said valve member, said jet aperture being disposed between said limiting means such that the distance over which said piston travels to the position where it closes said aperture is at least about the diameter of said piston.

13. The invention as set forth in claim 10 wherein said housing has a groove in the inner wall thereof, said sleeve having an upper end of larger outer diameter than the lower end thereof, said upper end being disposed in said groove and defining a control chamber therein, said aperture extending into said groove above said control chamber, the upper end of said groove defining a sealing lip which closes said aperture when said sleeve moves upwardly, and said valve member actuating means comprising means for applying pressurized fluid selectively at supply and return pressures to said control chamber such that the net forces on said sleeve are in an upward direction or in a downward direction.

14. The invention as set forth in claim 13 wherein the area of the upper end of said sleeve in a plane normal to the direction of travel of said valve is about twice that of the lower end of said sleeve, the area in a plane normal to the direction of movement of said sleeve presented by said sleeve to said control chamber is about half said area of the upper end of said sleeve, and said pressure supplied to said first chamber and said supply pressure are about equal to each other.

* * * * *